(No Model.)  5 Sheets—Sheet 1.

T. S. EVANS & E. H. BISSETT.
MACHINE FOR MAKING STOVE PIPE ELBOWS.

No. 343,631.  Patented June 15, 1886.

Witnesses:
John Griot
C. E. Pinnock

Inventors:
T. S. Evans
E. H. Bissett
By Henry Grish
Attorney.

(No Model.) 5 Sheets—Sheet 2.

T. S. EVANS & E. H. BISSETT.
MACHINE FOR MAKING STOVE PIPE ELBOWS.

No. 343,631. Patented June 15, 1886.

Witnesses:
John Grist
C. E. Pinnock

Inventors:
T. S. Evans
E. H. Bissett
By Henry Grist
Att'y.

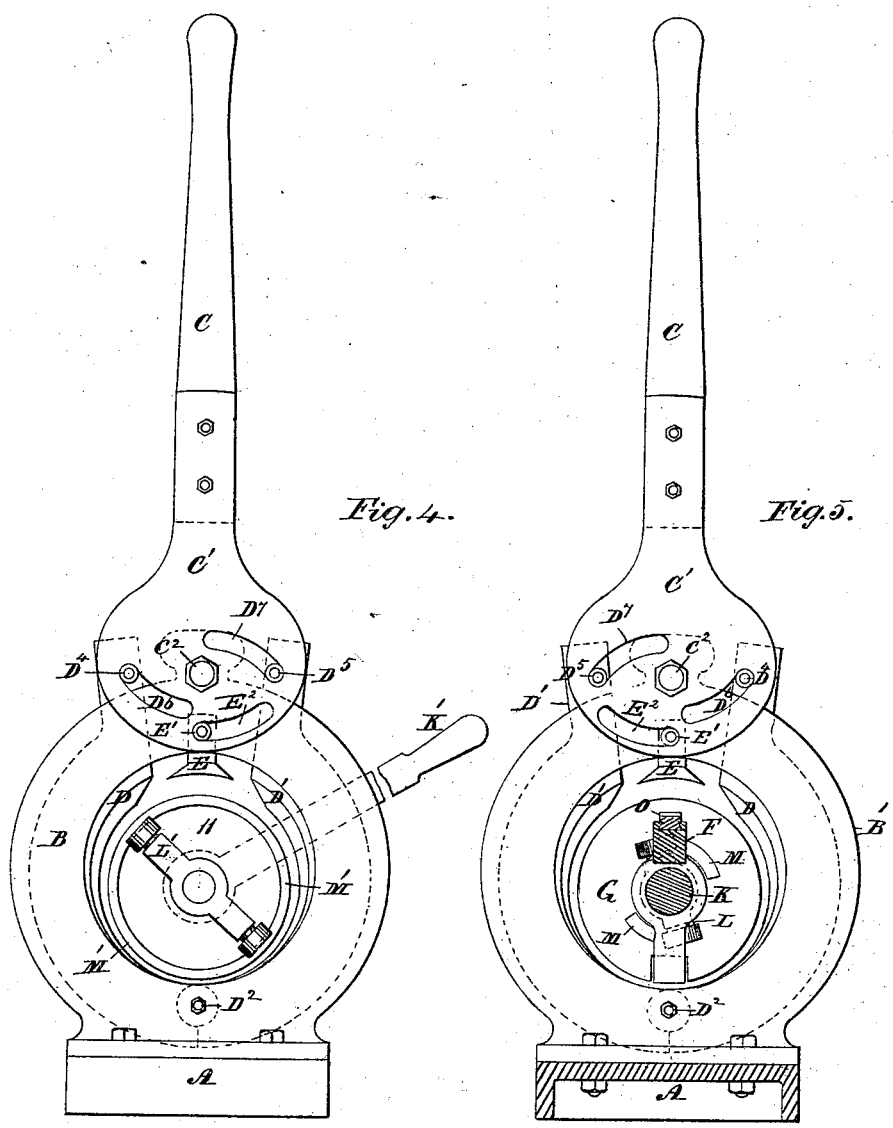

(No Model.) 5 Sheets—Sheet 4.
T. S. EVANS & E. H. BISSETT.
MACHINE FOR MAKING STOVE PIPE ELBOWS.
No. 343,631. Patented June 15, 1886.
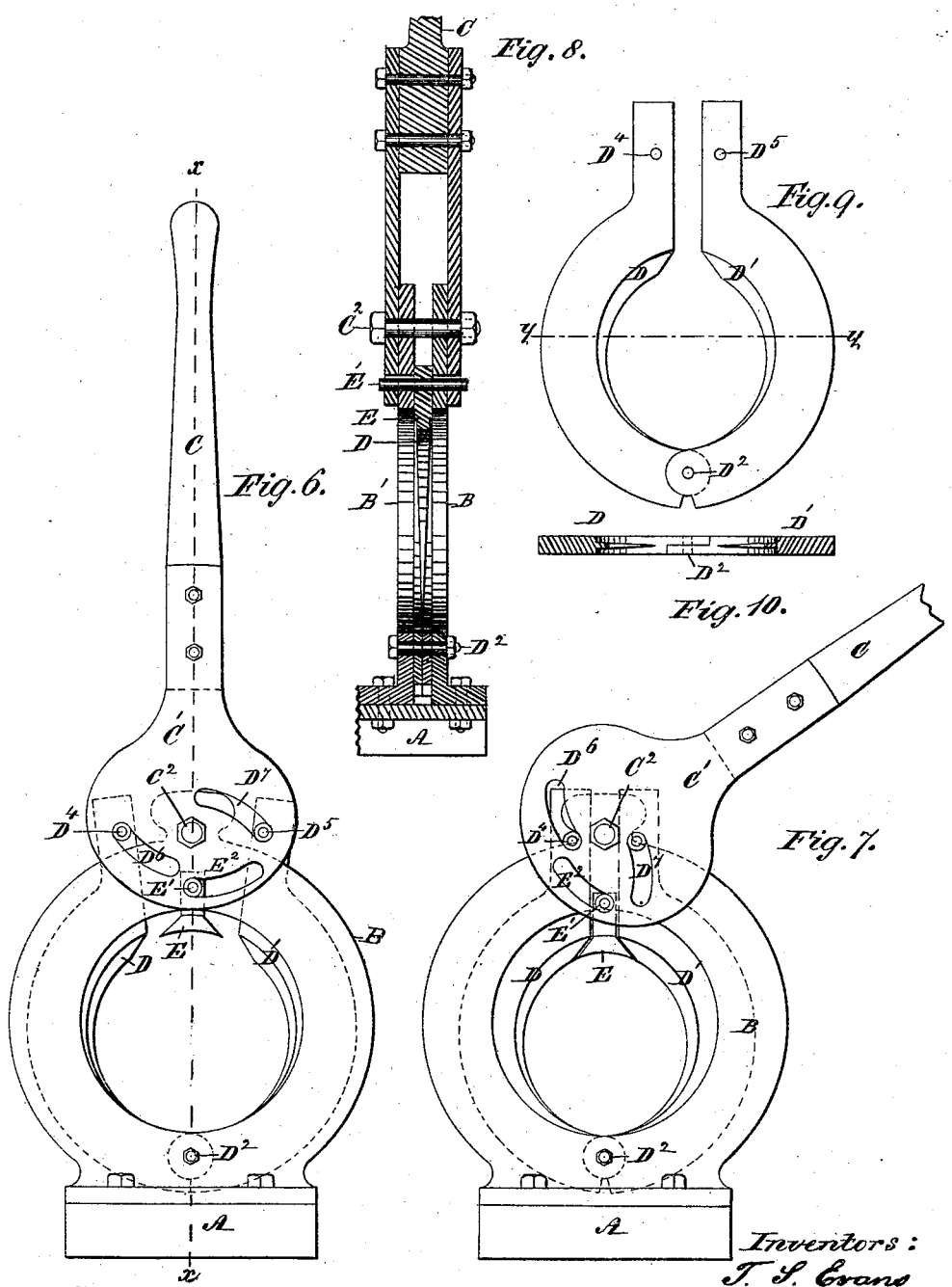

(No Model.) 5 Sheets—Sheet 5.

T. S. EVANS & E. H. BISSETT.
MACHINE FOR MAKING STOVE PIPE ELBOWS.

No. 343,631. Patented June 15, 1886.

Witnesses:
John Grist
C. G. Pennock

Inventors:
T. S. Evans
E. H. Bissett
By Henry Grist
Att'y.

UNITED STATES PATENT OFFICE.

THOMAS SIDNEY EVANS AND EDWIN HUDSON BISSETT, OF WINNIPEG, MANITOBA, CANADA.

MACHINE FOR MAKING STOVE-PIPE ELBOWS.

SPECIFICATION forming part of Letters Patent No. 343,631, dated June 15, 1886.

Application filed August 21, 1885. Serial No. 175,007. (No model.) Patented in Canada September 1, 1885, No. 22,339.

*To all whom it may concern:*

Be it known that we, THOMAS SIDNEY EVANS and EDWIN HUDSON BISSETT, both of Winnipeg, in the county of Selkirk, in the Province of Manitoba, in the Dominion of Canada, have jointly invented certain new and useful Improvements in Machines for Making Crimped Stove-Pipe Elbows; and we do hereby declare that the following is a full, clear, and exact description thereof, reference being had to the accompanying drawings, in which—

Figure 1:
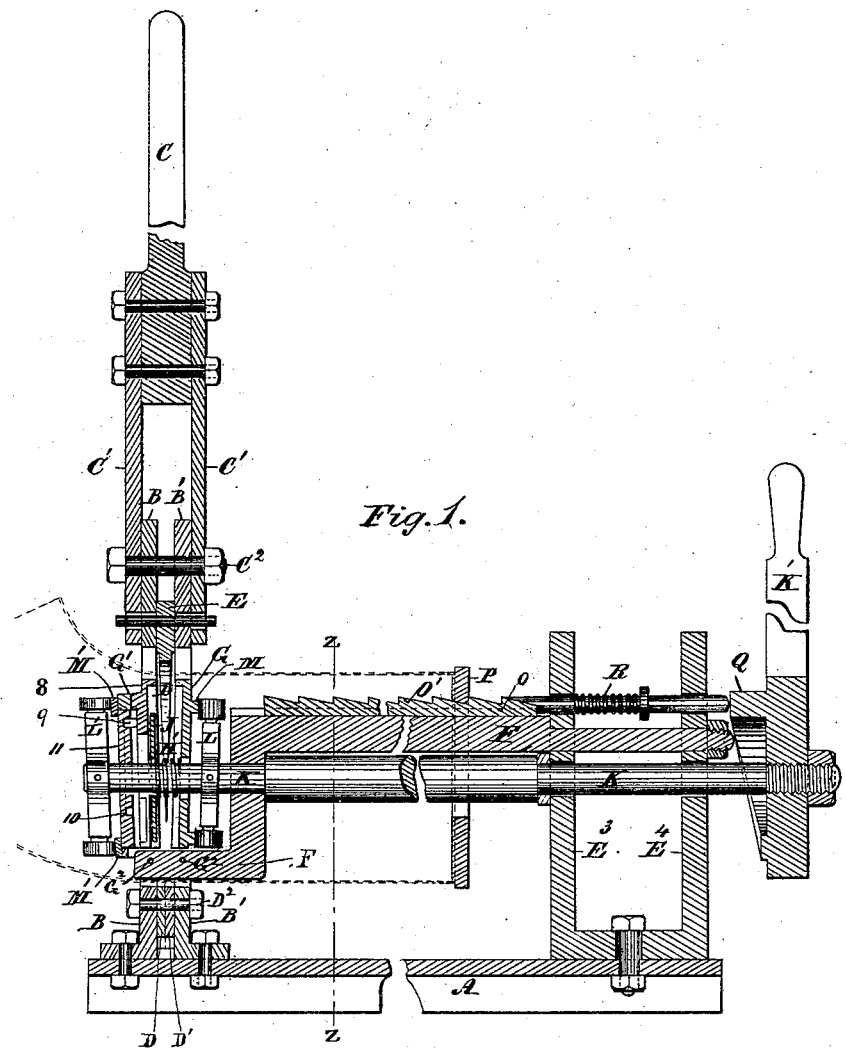
Figure 2:
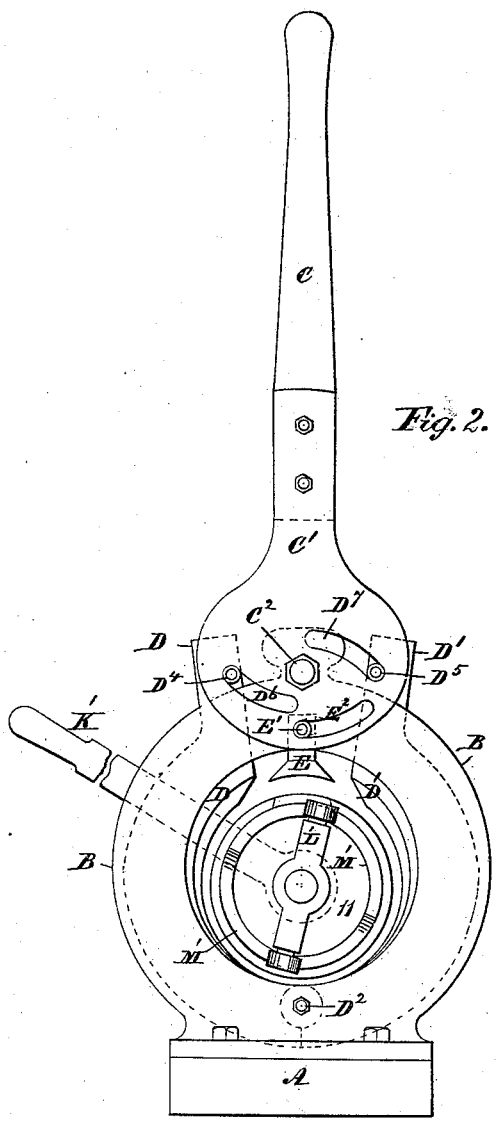
Figure 3:
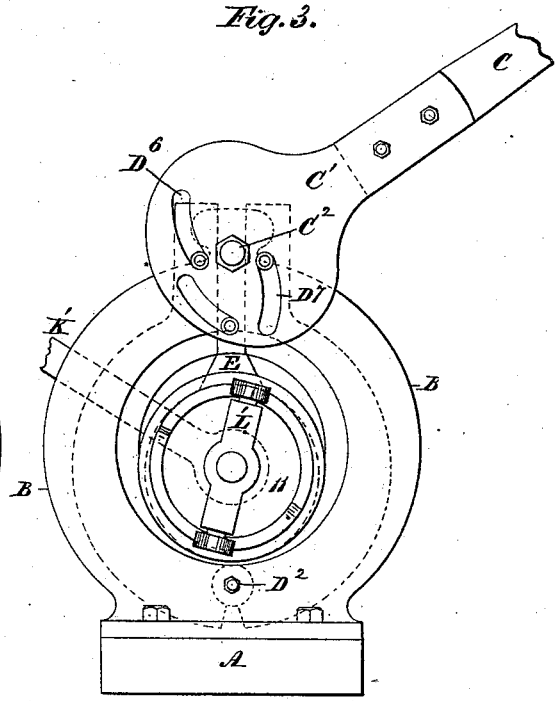
Figure 11:
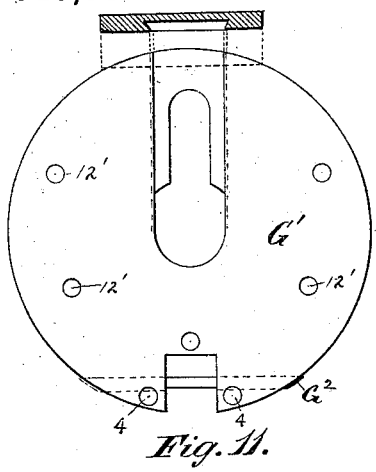
Figure 12:
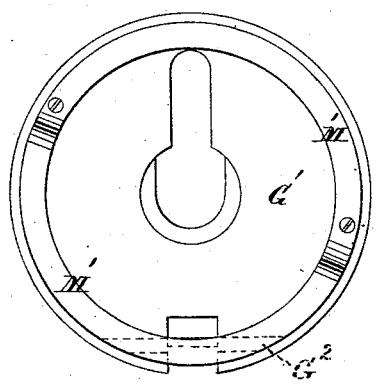
Figure 13:
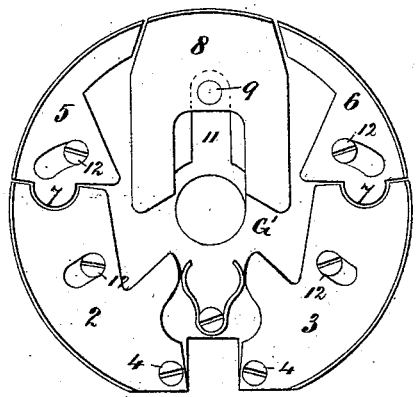
Figure 14:
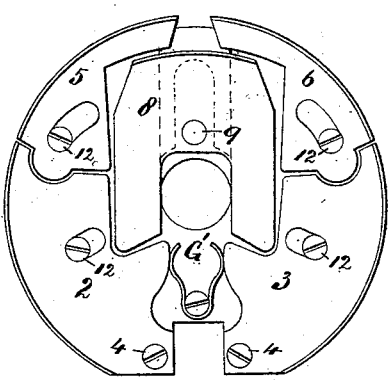
Figure 16:
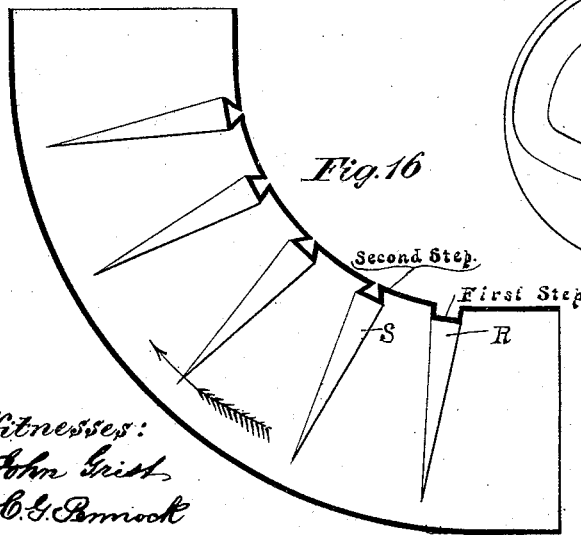
Figure 15:
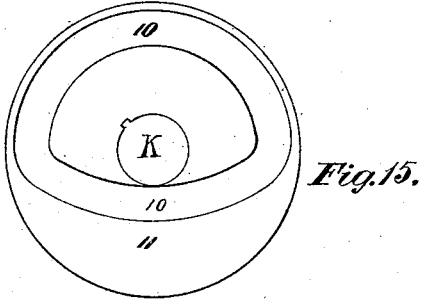

Figure 1 is a longitudinal vertical section of our machine. Fig. 2 is an elevation of one end of the same, showing the male dies in open position to receive the blank. Fig. 3 is a like view showing the male dies closed at the first stage for crimping a rectangular corrugation. Fig. 4 is a like view showing the male dies lifted and the female dies brought together laterally, as at the second stage, to pinch the rectangular corrugation to a triangular form. Fig. 5 is a section of Fig. 1 on line $z\ z$. Fig. 6 is an elevation on one end of the machine, showing the male dies in open position, the female dies being removed. Fig. 7 is a like view showing the male dies closed. Fig. 8 is a section of Fig. 6 on line $x\ x$. Fig. 9 is an elevation of a pair of male dies detached. Fig. 10 is a section of the same on line $y\ y$, Fig. 9. Fig. 11 is an elevation of the inside face of the female die G'. Fig. 12 is an elevation of the opposite face of Fig. 11. Fig. 13 is an elevation of the interior face of one of the female dies, showing sections expanded. Fig. 14 is a like view showing the sections contracted. Fig. 15 is an elevation of the inner face of cam-disk operating the movable sections of female die G'. Fig. 16 is a section of an elbow, showing the consecutive forms of swaging produced by our machine.

Our invention has for its object to construct a machine for making the crimped stove-pipe elbows for which a patent was granted to us, dated March 17, 1885, and numbered 313,858; and it consists in certain combinations of dies, by which a rectangular tapering corrugation is first made in the blank to form the lesser arc of the elbow, and then the outer angles of the corrugations are pinched together to form a triangle in cross-section on the inside of the pipe, whereby the surplus metal may be flattened down equally on both sides of the seam by a roller traveling on the inside of the pipe, to smooth the surplus metal over the seam, as described in our before-mentioned patent.

A is the base of the machine, to which is bolted vertically a pair of flat rings, B B'.

C is a lever having two cam-plates, C', fulcrumed to the outside face of rings B B' by a bolt, C², passing through an upward prolongation of the rings.

D D' are male dies pivoted between rings B B' by bolts D². The upper ends of the dies have prolongations, in which are fixed pins D⁴ D⁵, which work in cam-slots D⁶ D⁷ in the cam-plate C', so that by movement of the lever the dies D D' are operated compressively. The inner curved face of dies D D', by grooving out the sides, tapers from the top to bottom, to impress in the blank a corrugation tapering from end to end and rectangular in cross-section when operated between female dies, hereinafter described.

E is a die hung in a vertical slot in rings B B', intermediate of the dies D D', by pins E', passing through cam-slots E² in cam-plates C', and said die E descends when the dies D D' close together, and with them makes approximately a circle to corrugate the sheet-metal blank on the lesser arc of the stove-pipe elbow. Near the opposite end of base A are standards E³ E⁴, to carry a bar, F, which at the opposite end is bent downwardly and outwardly to carry circular female dies G G', which are slotted at the bottom to receive bar F and be connected thereto by pintles G², so that the hinged dies will move apart inclinedly by the tension of an intermediate spiral spring, H', to interveningly admit the male dies D D'. The female die G is a circular disk having an inwardly-turned edge at its periphery, and in diameter corresponds to that of the elbow. G' is a female die of less diameter, and approximately corresponds to the diameter of the stove-pipe inside the corrugations, and both dies G G' face together and are hinged at the bottom to bar F by pintles G². The die G' on its inner face is provided with five movable sections to expand the die to the diameter of die G. The segmental lower sections, 2 3, are severally pivoted by pins 4 to the die G'. The upper segmental sections, 5 6, are respectively attached to sections 2 3 by knuckle-joints 7, and section 8 is dovetailed to the die to slide radially, and is provided with a cam-arm, 9, passing through a radial slot in die G', and enters a cam-groove, 10, in a circular disk, 11, which is rotated by a shaft, hereinafter referred to, so that by the radial movement of section 8 the other movable sections of the die are contracted together or forced apart to make the diameter of the die larger or smaller, alternately, at each impression of the dies, as hereinafter explained, whereby the crimp, when the dies are released, will pass over the contracted die to allow the succeeding crimp to be made in the blank. The segmental sections of die G' have an inwardly-turned peripheral edge, and are held in position against the die by plate J, against which a spiral spring, H', impinges, and the sections 2 3 5 6 have curved slots, through which pass pins 12, entering openings 12' on the plate G', to guide their movement. The spring H' is interposed between the dies G G' to throw them inclinedly apart after being drawn together to close the outer part of the crimp, to admit the male dies D D' when making the succeeding crimp in the blank.

K is a shaft passing through the standards E³ E⁴, and is provided at one end with a handle, K', for its rotation. The other end of the shaft passes through a cross-head, L, keyed on shaft K, thence through die G and plate J, loose thereon, thence through die G', loose thereon, thence through cam-disk 11 and cross-head L', keyed thereon.

The outside faces of dies G G' are each provided with cams M M and M' M', respectively, so that by turning shaft K dies G G' will be brought laterally together and pinch together the outer angles of the rectangular corrugation in the blank to make it triangular in cross-section when the heads L L' are passing the cams, and after passing the dies will be spread apart at top by the expansion of spiral spring H', to admit the male dies in making the subsequent rectangular corrugation.

The blank is fed to the crimpers by a rack-bar, O, reciprocative in a longitudinal groove in bar F.

P is a circular plate, slotted to allow bars O F and shaft K to pass through and slide over the racks of bar O, and the periphery of plate P is rabbeted to form a mandrel corresponding to the inner diameter of the pipe, and around the mandrel the sheet blank is laid and the plate moved up until the end of the pipe is surrounded by the dies D D'. At each impression of the dies to make one corrugation plate P is moved one notch to feed the pipe to the dies, and such feeding is automatically effected by a cam, Q, on handle K', operating to push bar O endwise at each revolution, and is retracted by spiral spring R. The path of the pipe is shown in dotted lines.

After the pipe has been crimped it is removed to another machine, and the crimps are flattened down by a roller traveling on the inside of the pipe.

This machine will be the subject-matter of another application for a patent.

The operation of the machine is as follows: The mandrel-plate P is retired and the sheet-iron plate wound around the mandrel, the edges overlapping. The plate P is then advanced until the end of the sheet-iron blank is introduced between the male and female dies, when the latter are opened apart in V form and the former raised, as shown in Fig. 2. Lever C is then in an upright position, and is subsequently brought to a sloping position, thereby closing the male dies together, as seen in Fig. 3, to impress the blank between the female dies, whereby a tapering crimp of rectangular form in cross-section is formed in the sheet-metal blank, as shown at R in Fig. 16. Lever C is then returned to a vertical position to lift the male dies. Shaft K is then rotated by handle K', when the female dies will close laterally together, the inturned peripheral edge of the dies pinching the rectangular corrugation into a triangular form in cross-section, as shown at S in Fig. 16, the base being inwardly of the pipe, the apex forming the seam on the lesser arc of the elbow. By further rotation of the shaft K by handle K', die G' will contract diametrically by the sections closing together, as seen in Fig. 14, thereby allowing the crimp just formed to pass die G' during the forward feed motion of mandrel-plate P by the endwise movement of push-bar O. The elbow, after each crimp is formed, moves in an upward curve, as shown in dotted lines in Fig. 1, and after the required number of crimps are formed it is wholly removed, and the crimps flattened by another machine, whereby the surplus metal is thrown equally on both sides of the seam, as described in our former patent.

We claim as our invention—

1. The combination, with the annular rings B B', of the male dies D D' E, having pins D⁴, D⁵, and E', respectively, cam-plates C', having cam-slots D⁶ D⁷ E², and female dies G G', to swage a rectangular tapering corrugation, as set forth.

2. The combination, with the annular rings B B' and cam-plates C', having slots D⁶ D⁷ E², and lever C, of the male dies D D' E, having respectively pins D⁴, D⁵, and E', female dies G G', plate J, spring H', cam-disk 11, segmental sections 2 3 5 6 8, cam-disk M M', shaft K, having cross-heads L L', and bar F, whereby the blank is corrugated with rectangular tapering crimps between the male and female dies, and subsequently the outer angles of the corrugations are pinched together in triangular form in cross-section, as set forth.

3. The combination, with the annular rings B B', of the female dies G G', the latter having segmental sections 2 3 5 6 8, and both respectively provided with cams M M M' M', cam-disk 11, and shaft K, provided with cross-heads L L', whereby the dies are brought together to close the rectangular corrugation to a triangular form in cross-section and the outer female die contracted to allow the crimped material to pass when feeding the dies, as set forth.

4. The combination, with the bar F, carrying dies G G', provided with cam-rings M M', respectively, and die G', with sections 2 3 5 6 8, cam-disk 11, cross-heads L L', and shaft K, of the handle K', provided with cam Q, push-bar O, having racks O', spring R, and plate P, whereby the blank is fed to the dies simultaneously with contraction of one of the female dies, as set forth.

THO. S. EVANS.
EDWIN H. BISSETT.

Witnesses:
C. G. PENNOCK,
JOHN GRIST.